United States Patent
Smith, Jr.

(10) Patent No.: US 6,759,782 B2
(45) Date of Patent: Jul. 6, 2004

(54) POLE PIECE ASSEMBLY

(75) Inventor: Patrick J. Smith, Jr., Birmingham, MI (US)

(73) Assignee: The Piece Maker Company, Troy, MI (US)

( * ) Notice: Subject to any disclaimer, the term of this patent is extended or adjusted under 35 U.S.C. 154(b) by 0 days.

(21) Appl. No.: 10/401,346

(22) Filed: Mar. 26, 2003

(65) Prior Publication Data

US 2003/0184182 A1 Oct. 2, 2003

Related U.S. Application Data

(60) Provisional application No. 60/367,576, filed on Mar. 26, 2002.

(51) Int. Cl.$^7$ ................................................ H02K 1/28
(52) U.S. Cl. ...................... 310/218; 310/216; 310/317
(58) Field of Search ............................... 310/218, 216, 310/254

(56) References Cited

U.S. PATENT DOCUMENTS

| | | | |
|---|---|---|---|
| 792,607 A | * | 6/1905 | McElroy ..................... 310/218 |
| 922,760 A | | 5/1909 | Firmin |
| 1,991,092 A | | 2/1935 | Hathaway |
| 1,997,550 A | | 4/1935 | O'Leary |
| 2,073,348 A | | 3/1937 | Merkle |
| 2,236,291 A | | 3/1941 | Kilbourne |
| 2,512,351 A | | 6/1950 | Lynn |
| 3,534,205 A | | 10/1970 | D'Ornano |
| 3,626,219 A | | 12/1971 | Lease |
| 3,859,549 A | | 1/1975 | Boesel |
| 3,891,881 A | | 6/1975 | Harris et al. |
| 4,433,472 A | * | 2/1984 | Andoh et al. ................. 29/596 |
| 5,045,742 A | * | 9/1991 | Armstrong et al. ......... 310/254 |
| 5,276,958 A | * | 1/1994 | Larsen ......................... 29/596 |
| 5,493,162 A | * | 2/1996 | Wuerth et al. ............... 310/218 |

* cited by examiner

Primary Examiner—Burton S. Mullins
Assistant Examiner—Nguyen N Hanh
(74) Attorney, Agent, or Firm—Howard & Howard

(57) ABSTRACT

A pole piece assembly (28) for an electric motor (20) formed of stacked interlocked lamina (46) that define a first set of stacked lamina (50) and a second set of stacked lamina (52). Each of the lamina (46) of the first (50) and second (52) sets of stacked lamina include a hole (60) with the holes (60) being aligned with each other to define an internal cavity. A post (64) is disposed within the cavity with the post (64) having an outer surface (66) and a pair of bores (68) disposed therein. The pole piece assembly (28) is characterized by each of the lamina (46) of the second set of stacked lamina (52) further including a notch (74, 78) with the notch (74, 78) mating with the hole (60). The notches (74, 78) of the second set of stacked lamina (52) are aligned with each other to define a passageway into the internal cavity with the bore (68) of the post (64) being aligned with the passageway to expose the bore (68).

41 Claims, 5 Drawing Sheets

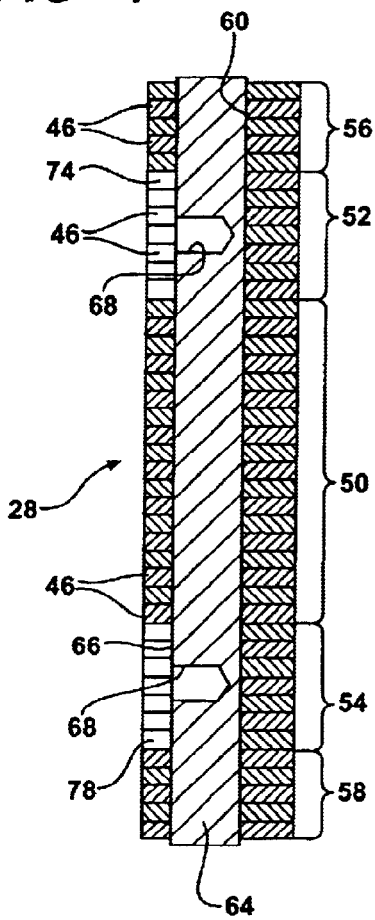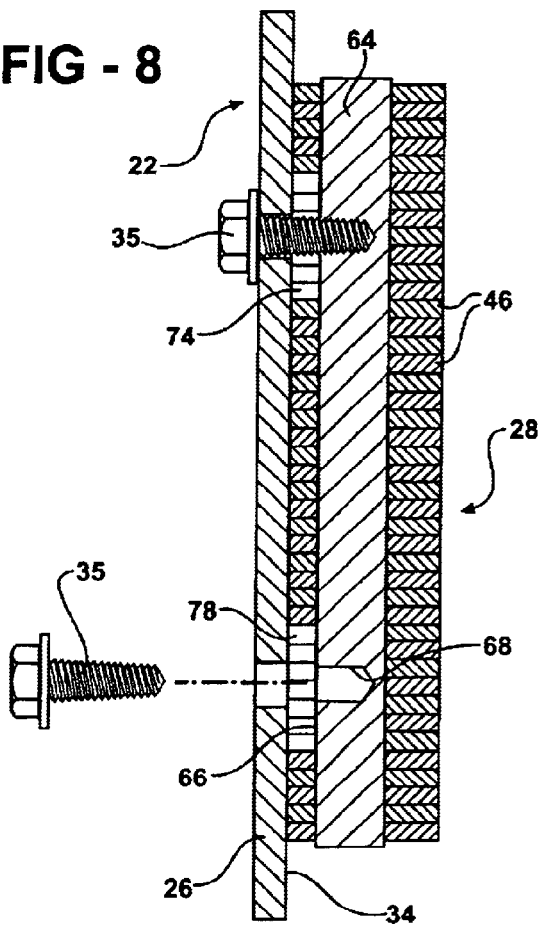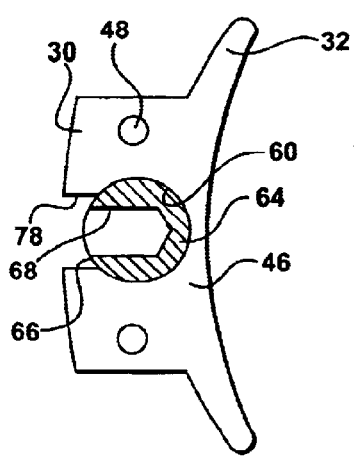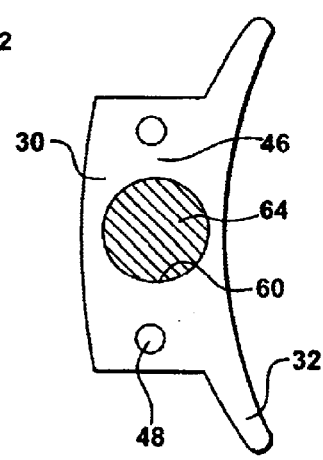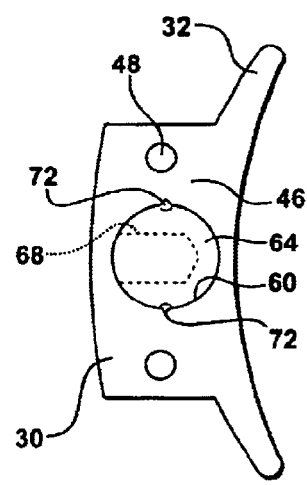
FIG - 7    FIG - 8
FIG - 9    FIG - 10    FIG - 11

POLE PIECE ASSEMBLY

CROSS-REFERENCE TO RELATED APPLICATIONS

The subject patent application claims priority to and all the benefits of U.S. Provisional Patent Application Serial No. 60/367,576, which was filed on Mar. 26, 2002.

BACKGROUND OF THE INVENTION

1. Field of the Invention

The subject invention relates to a laminated pole piece assembly for use in an electric motor.

2. Description of Related Art

Laminated pole piece assemblies for electric motors are well known in the art. As shown in FIG. 1, laminated pole piece assemblies 10 are typically formed of a plurality of lamina 12 that are stacked onto each other. U.S. Pat. No. 2,512,351 also illustrates a typical laminated pole piece assembly. The stacked plurality of lamina can be held together by brazing, such as discussed in the '351 patent. Many of the laminated pole piece assemblies 10 also include a post 14 extending through a central portion thereof. U.S. Pat. Nos. 922,760 and 1,991,092 also illustrate such a structure. As shown in U.S. Pat. No. 2,236,291, the laminated pole piece assemblies are often bolted to a stator of the electric motor.

It is well known in the metal lamination industry that drilling into the laminated pole piece assemblies 10 creates a host of problems. In particular, the lamina 12 have a tendency to separate from each other during the drilling process. In addition, a series of burs 16 are typically created at an outer surface of the lamina 12, see FIG. 1. Also, a portion of each of the lamina 12 is placed into integral contact with an adjacent lamina 12, which is known in the industry as "wiping", again see FIG. 1. This integral contact creates an undesirable short circuit at the drilling interface thereby concentrating the electrical flux pattern and increasing the temperature at this point. This short circuit in turn reduces the electrical efficiency of the electric motor.

Accordingly, it would be desirable to develop a laminated pole piece assembly that can be bolted to a stator of an electric motor without drilling into the stack of interlocked lamina.

SUMMARY OF THE INVENTION AND ADVANTAGES

A pole piece assembly for an electric motor comprising a plurality of lamina stacked onto each other defining a first set of stacked lamina and a second set of stacked lamina. Each of the lamina of the first and second sets of stacked lamina include a hole disposed therein with the holes being aligned with each other to define an internal cavity. A post is disposed within the cavity with the post having an outer surface and at least one bore disposed therein. The pole piece assembly is characterized by each of the lamina of the second set of stacked lamina further including a first notch disposed therein with the first notch mating with the hole. The first notches of the second set of stacked lamina are aligned with each other to define a first passageway into the internal cavity with the bore of the post being aligned with the first passageway to expose the bore.

Accordingly, the subject invention resolves the problems associated with the prior art by incorporating a notch in the lamina surrounding the bore to define a passageway to the bore. As such, a bolt can be tapped into the bore of the post through the passageway to mount the pole piece assembly to a stator without drilling through the stacked lamina. Preferably, a counter bore configuration is created.

BRIEF DESCRIPTION OF THE DRAWINGS

Other advantages of the present invention will be readily appreciated as the same becomes better understood by reference to the following detailed description when considered in connection with the accompanying drawings wherein:

FIG. 7 is a cross sectional side view of the pole piece assembly taken along line 7—7 of FIG. 6;

FIG. 8 is a cross sectional view of the pole piece assembly of FIG. 7 mounted to the stator;

FIG. 9 is a cross sectional view of the pole piece assembly taken along line 9—9 of FIG. 6;

FIG. 10 is a cross sectional view of the pole piece assembly taken along line 10—10 of FIG. 6;

FIG. 11 is a cross sectional view of the pole piece assembly taken along line 11—11 of FIG. 6.

DETAILED DESCRIPTION OF THE INVENTION

Figure 1:
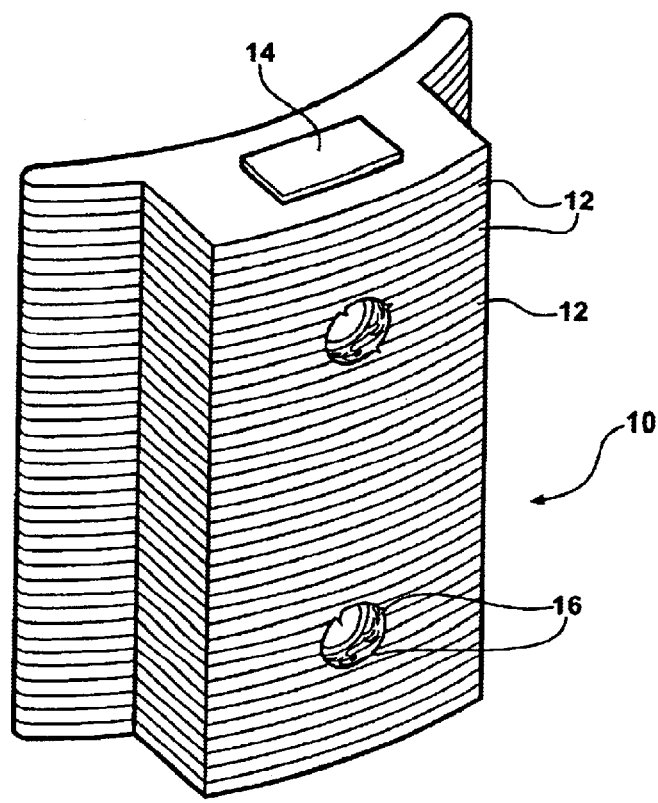
FIG. 1 is a perspective view of a prior art pole piece assembly.
Figure 2:
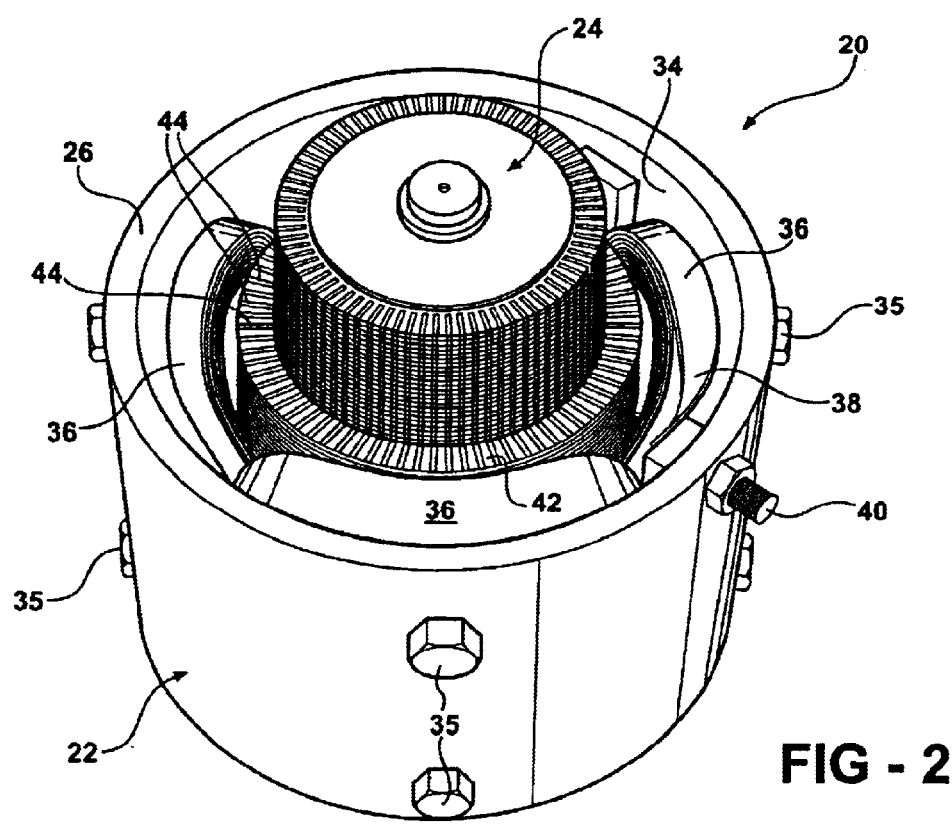
FIG. 2 is a perspective view of a stator and rotor of an electric motor.
Figure 3:
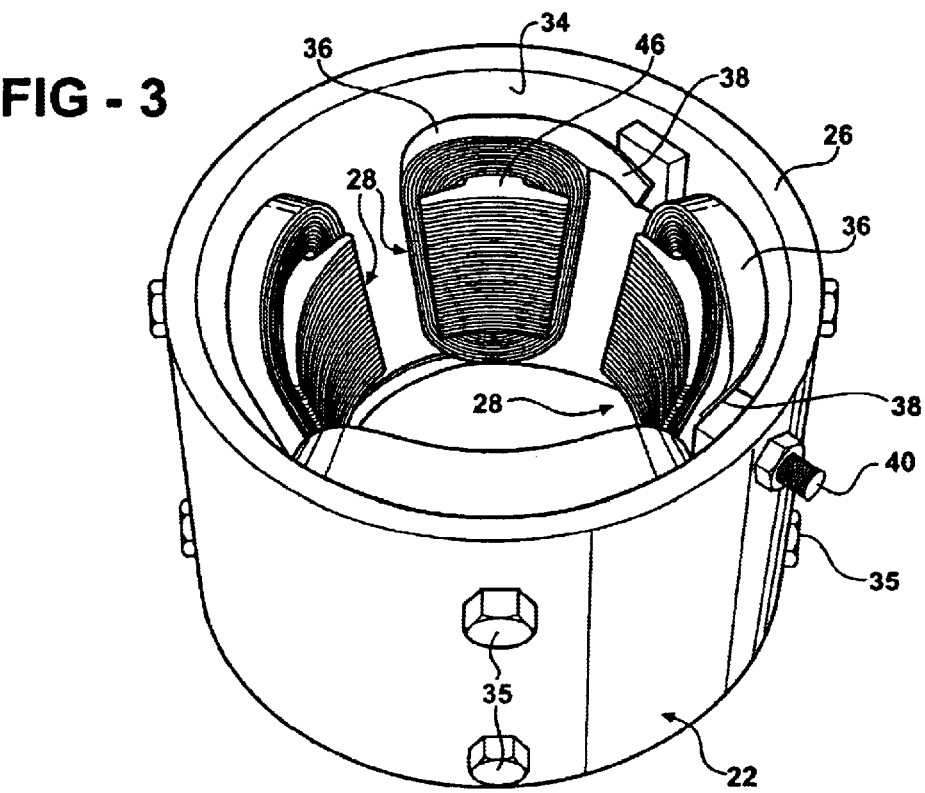
FIG. 3 is a perspective view of the stator with pole piece assemblies in accordance with the subject invention installed therein.
Figure 4:
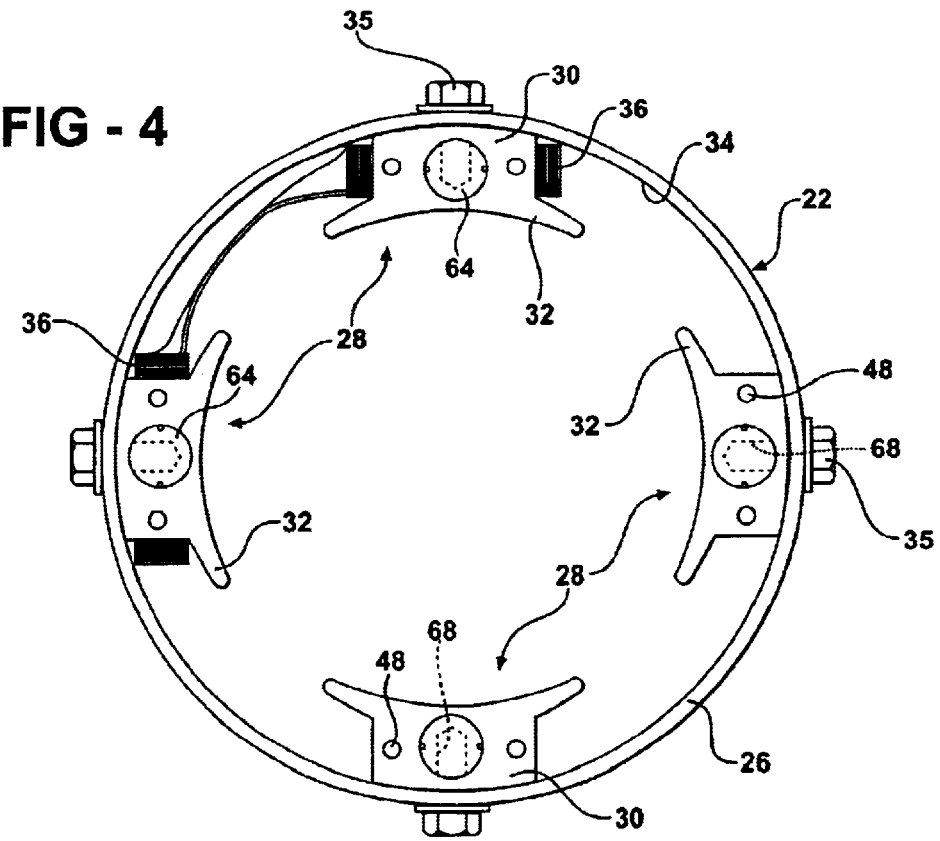
FIG. 4 is a top view of the stator with the pole pieces assemblies of the subject invention installed therein.

Referring to the Figures, wherein like numerals indicate like or corresponding parts throughout the several views, an electric motor is generally shown at 20 in FIGS. 2–4. The electric motor 20 comprises a stator 22 and a rotor 24. The stator 22 includes a tubular housing 26 and a plurality of pole piece assemblies 28 mounted equidistantly about the housing 26. The pole piece assemblies 28 preferably each have a pole portion 30 and an arcuate portion 32 and are mounted to an inner surface 34 of the housing 26 by a pair of bolts 35. A plurality of coil windings 36 are disposed about each pole portion 30 of the pole piece assemblies 28. Each of the coil windings 36 are interconnected together to define a pair of distal ends 38. The distal ends 38 of the coil windings 36 are connected to terminals 40 on the stator 22. For illustrative purposes, only a portion of two of the coil windings 36 are shown in FIG. 4.

The rotor 24, shown in FIG. 2, is formed of a plurality of laminations 42 with each of the laminations 42 having an outer circumference and a plurality of equally spaced slots 44 as is known in the art. The rotor 24 is disposed within the stator 22 with the outer circumference of the laminations 42 having a configuration complementary with the arcuate portion 32 of the pole piece assemblies 28 and being separated from the arcuate portions 32 by an air gap. The general configurations and operation of the stator 22, rotor 24, pole piece assemblies 28, and coil windings 36 are all well known in the electrical motor arts and as such will not be discussed in any greater detail. In addition, these components may be of any suitable design or configuration without deviating from the overall scope of the subject invention. For example, the illustrated design of the pole portion 30 and arcuate portion 32 of the pole piece assemblies 28 is merely for descriptive purposes is not intended to limit the scope of the invention in any way.

Turning to FIGS. 5–11, one of the pole piece assemblies 28 is shown in greater detail. The pole piece assembly 28 includes a plurality of lamina 46 stacked onto each other with each of the lamina 46 having a corresponding pole portion 30 and arcuate portion 32. Preferably each of the lamina 46 have identical outer configurations such that the pole 30 and arcuate 32 portions align. It is contemplated, however, that some of the lamina 46 may have different outer configurations in order to satisfy certain requirements by a particular customer. Each lamina 46 of the plurality of lamina 46 preferably include at least one interlocking tab 48 for interlocking the plurality of lamina 46 together. Even more preferably, each lamina 46 of the plurality of lamina 46 include a pair of interlocking tabs 48 disposed on the pole portion 30 for interlocking the plurality of lamina 46 together. The process of interlocking laminated parts is well known in the metal lamination industry and therefore will not be discussed in any greater detail. It should be appreciated that the lamina 46 of the pole piece assemblies 28 may be connected together by other means such as brazing or welding.

Figure 6:
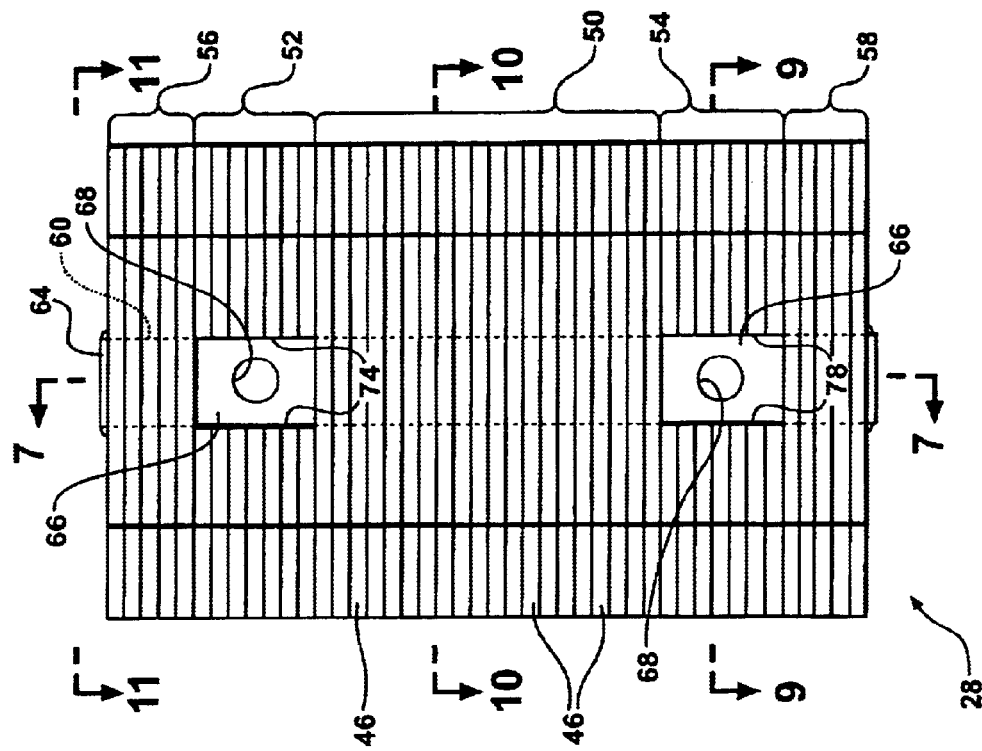
FIG. 6 is a front view of the pole piece assembly.
Figure 5:
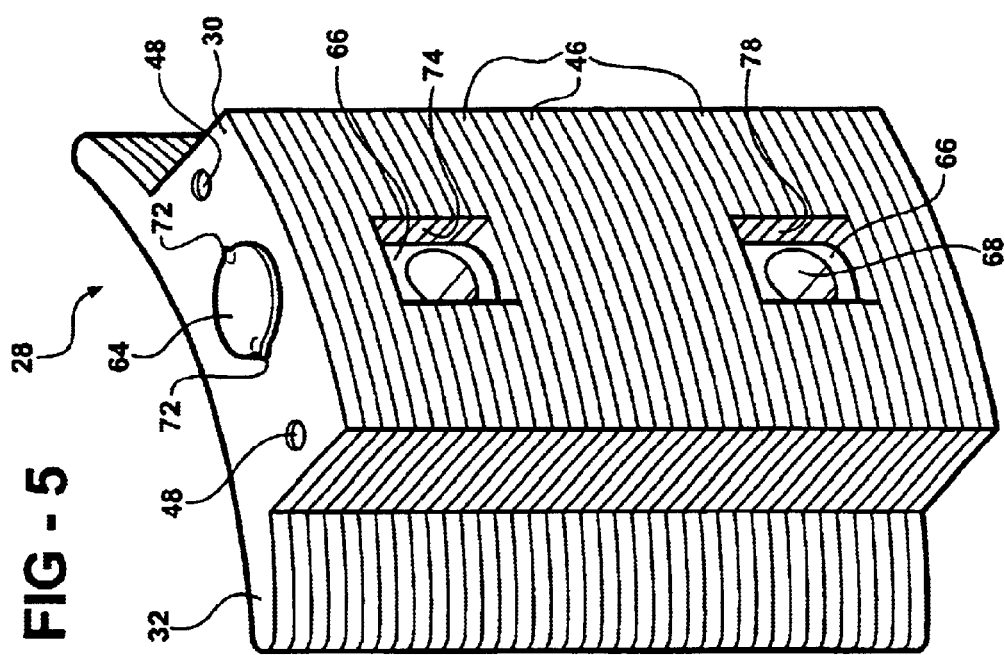
FIG. 5 is a perspective view of the pole piece assembly in accordance with the subject invention.

As indicated best in FIGS. 6 and 7, the plurality of lamina 46 preferably define at least a first set of stacked lamina 50 and a second set of stacked lamina 52. Even more preferably, the plurality of lamina 46 also define a third set of stacked lamina 54, a fourth set of stacked lamina 56, and a fifth set of stacked lamina 58. As illustrated best in FIGS. 5–8, the fourth set of stacked lamina 56 creates a top of the pole piece assembly 28 and the fifth set of stacked lamina 58 creates a bottom of the pole piece assembly 28. The second 52 and third 54 sets of stacked lamina abut opposing ends of the first set of stacked lamina 50 to encompass the first set of stacked lamina 50. As such, the first set of stacked lamina 50 is sandwiched between the second 52 and third 54 sets of stacked lamina. The fourth set of stacked lamina 56 abuts the second set of stacked lamina 52 and the fifth set of stacked lamina 58 abuts the third set of stacked lamina 54 such that the second 52 and third 54 sets of stacked lamina are in turn sandwiched between the fourth 56 and fifth 58 sets of stacked lamina. Each of the sets of stacked lamina 50, 52, 54, 56, 58 will be discussed in greater detail below.

Each of the lamina 46 of the first 50 and second 52 sets of stacked lamina include a hole 60 disposed therein with the holes 60 being aligned with each other to define an internal cavity. Similarly, each of the lamina 46 of the third 54, fourth 56, and fifth 58 sets of stacked lamina also have the hole 60 disposed therein such the internal cavity extends from the top to the bottom of the pole piece assembly 28. The holes 60 are formed during the stamping of the lamina 46 as is discussed in greater detail below. Preferably, the hole 60 is substantially circular and extends centrally through the pole portion 30 of the lamina 46. It should be appreciated that the hole 60 may be of any suitable configuration and disposed in any suitable location.

A post 64 is disposed within the cavity with the post 64 having an outer surface 66 and at least one bore 68 disposed therein. Preferably, the post 64 is substantially circular to fit snugly within the circular holes 60 and has a plurality of bores 68 disposed therein. As discussed in greater detail below, the bores 68 can be formed before or after the post 64 is inserted into the cavity. As illustrated, there are two smooth bores 68 formed within the post 64. In particular, the bores 68 initially have a smooth inner surface. The bolts 35, however, preferably have self-tapping threads. Hence, the threads of the bolts 35 passing through the stator 22 and into the bores 68 form interlocking grooves within the bores 68. The bolts 35 are then threaded to the post 64 which securely mounts the pole piece assemblies 28 to the stator 22. The post 64 also includes a pair of distal ends with at least one of the ends, preferably both, being punched to form indentations 72 within the ends of the post 64 and to slightly deform the post 64 which securely interlocks the post 64 to the plurality of lamina 46. The punching of the post 64 can work in conjunction with the interlocking tabs 48 to ensure that the plurality of lamina 46 are securely interlocked together. The punching and deforming of the post 64 can alternatively be the sole means of interlocking the lamina 46 together. Hence, the interlocking tabs 48 can be eliminated. In addition, the post 64 can be of any suitable configuration and may be of a non-circular shape to assist in holding the lamina 46 together.

As best shown in FIGS. 5–9, each of the lamina 46 of the second set of stacked lamina 52 further include a first notch 74 disposed therein. The first notch 74 mates with the hole 60 such that the first notches 74 of the second set of stacked lamina 52 are aligned with each other to define a first passageway into the internal cavity. Preferably, each of the first notches 74 are formed in the pole portion 30, are substantially rectangular, and mate with the circular hole 60. One of the bores 68 is aligned with the first passageway to expose the bore 68. Of course, if the bore 68 is formed after the post 64 is inserted into the cavity, then only the outer surface 66 of the post 64 will initially be exposed until the bore 68 is formed. In either case, the bore 68 is created within the post 64 without disturbing the lamina 46.

Similarly, each of the lamina 46 of the third set of stacked lamina 54 further include a second notch 78 disposed therein. The second notch 78 mates with the hole 60 such that the second notches 78 of the third set of stacked lamina 54 are aligned with each other to define a second passageway into the internal cavity. Preferably, each of the second notches 78 are likewise formed in the pole portion 30, are substantially rectangular, and mate with the circular hole 60. Another one of the bores 68 is aligned with the second passageway to expose the other bore 68. As stated above, if the bore 68 is formed after the post 64 is inserted into the cavity, then only the outer surface 66 of the post 64 will initially be exposed until the bore 68 is formed. As also stated above, no matter how the bore 68 is formed within the post 64, the lamina 46 are not disturbed. The first 74 and second 78 notches are also formed during the stamping of the lamina 46 as is discussed in greater detail below.

As illustrated in FIGS. 5–8, the first passageway of the second set of stacked lamina 52 is larger than the bore 68 such that at least a portion of the outer surface 66 of the post 64 is exposed and is also aligned with the first passageway to create a counter bore configuration. Similarly, the second passageway of the third set of stacked lamina 54 is larger than the bore 68 such that at least a portion of the outer surface 66 of the post 64 is exposed and is also aligned with the second passageway to create another counter bore configuration.

The first passageway is preferably defined between the fourth 56 and first 50 sets of stacked lamina. Even more preferably, at least one lamina 46 of the second set of stacked lamina 52, having the first notch 74, is disposed above the bore 68 to further define the second set of stacked lamina 52 and the first passageway. Most preferably, at least one lamina 46 of the second set of stacked lamina 52, having the first notch 74, is also disposed below the bore 68 to further define the second set of stacked lamina 52 and the first passageway. This most preferred configuration of the first passageway, defined by the first notches 74 of the second set of stacked lamina 52, creates a substantially square or rectangular configuration.

Similarly, the second passageway is preferably defined between the fifth 58 and first 50 sets of stacked lamina. Even more preferably, at least one lamina 46 of the third set of stacked lamina 54, having the second notch 78, is disposed above the bore 68 to further define the third set of stacked lamina 54 and the second passageway. Most preferably, at least one lamina 46 of the third set of stacked lamina 54, having the second notch 78, is also disposed below the bore 68 to further define the third set of stacked lamina 54 and the second passageway. This most preferred configuration of the second passageway, defined by the second notches 78 of the third set of stacked lamina 54, also creates a substantially square or rectangular configuration.

In order to create uniformity in the pole piece assembly 28, the third set of stacked lamina 54 is preferably identical to the second set of stacked lamina 52. In other words, the second passageway is preferably identical to the first passageway.

The second 52 and third 54 sets of stacked lamina preferably include a fixed number of lamina 46 while the first set of stacked lamina 50 can have a varied number of lamina 46 to vary an overall height of the stacked plurality of lamina 46. This may be accomplished by a stack height controller (not shown) which measures the thickness of the steel material and varies the number of lamina 46 as desired. Of course the number of lamina 46 in the second 52 and third 54 sets of stacked lamina can also be varied if so desired.

Figure 12:
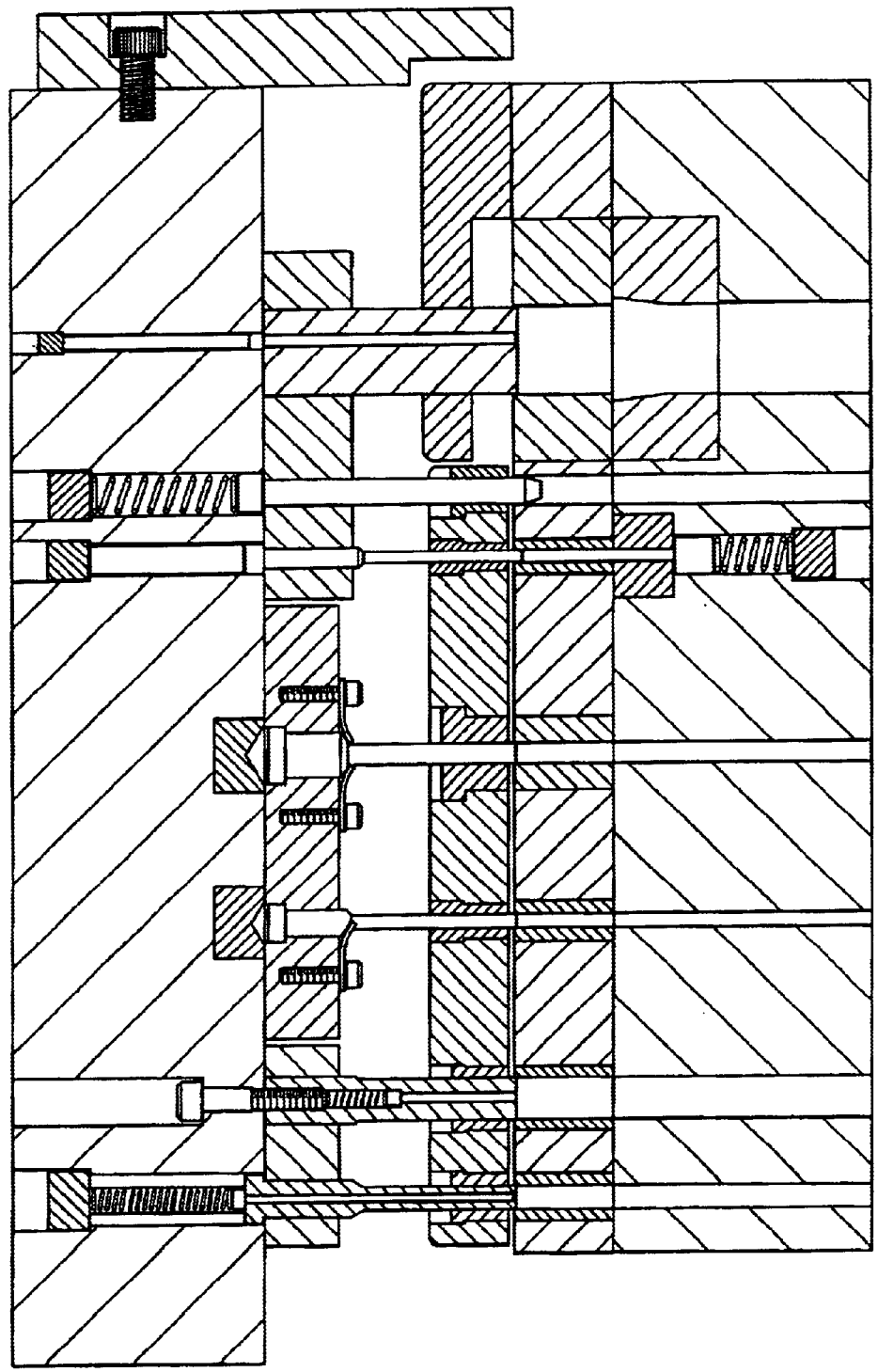
FIG. 12 is a partially cross sectional side view of a progressive stamping machine in accordance with the subject invention.

Turning to FIG. 12, a progressive stamping machine 82 for forming the lamina 46 is generally shown. These types of machines 82 are well known in the industry. Initially, a strip of stock material is fed into the stamping machine 82. The strip of stock material is then stamped in a sequential order with the completed lamina 46 being punched out of the strip of stock material. For example, the hole 60 could be punched first along with a pair of pilot holes. The interlock tabs 48 could then be formed. A select number of the lamina 46 will have a notch 74, 78 formed therein. At the end of the stamping machine 82, the lamina 46 is punched out and stacked. After the lamina 46 are stacked, the entire stack is punched to interlock each of the lamina 46 together. The internal cavity, first passageway, and second passageway are automatically formed when the lamina 46 are stacked. In other words, the holes 60 and notches 74, 78 formed within the lamina 46 align when the lamina 46 are stacked. The notches 74, 78 are formed in the lamina 46 at the appropriate time during the sequential stamping of the strip of stock material.

The post 64 can then be inserted into the internal cavity. As alluded to above, the bores 68 can be formed before the post 64 is inserted or afterwards. In either case, the passageways are formed large enough to allow full exposure of the bores 68. Preferably, the passageways are formed larger than the bores 68 to create a counter bore configuration to accommodate manufacturing tolerances of the post 64, bores 68, and/or lamina 46. The post 64 is then punched to slightly deform the post 64 such that the post 64 is interlocked to the lamina 46. The manufacture of the pole piece assembly 28 is now complete.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims the invention may be practiced otherwise than as specifically described.

What is claimed is:

1. A pole piece assembly (28) for an electric motor (20) comprising:

a plurality of lamina (46) stacked onto each other defining a first set of stacked lamina (50) and a second set of stacked lamina (52), each of said lamina (46) of said first (50) and second (52) sets of stacked lamina including a hole (60) disposed therein with said holes (60) being aligned with each other to define an internal cavity; and a post (64) disposed within said cavity with said post (64) having an outer surface (66) and at least one bore (68) disposed therein;

said assembly characterized by each of said lamina (46) of said second set of stacked lamina (52) further including a first notch (74) disposed therein with said first notch (74) mating with said hole (60) wherein said first notches (74) of said second set of stacked lamina (52) are aligned with each other to define a first passageway into said internal cavity with said bore (68) of said post (64) being aligned with said first passageway to expose said bore (68).

2. An assembly as set forth in claim 1 wherein said first passageway of said second set of stacked lamina (52) is larger than said bore (68) such that at least a portion of said outer surface (66) of said post (64) is also exposed and aligned with said first passageway to create a counter bore configuration.

3. An assembly as set forth in claim 2 further including at least one lamina (46) of said second set of stacked lamina (52), having said first notch (74), being disposed above said bore (68) to further define said second set of stacked lamina (52) and said first passageway.

4. An assembly as set forth in claim 3 further including at least one lamina (46) of said second set of stacked lamina (52), having said first notch (74), being disposed below said bore (68) to further define said second set of stacked lamina (52) and said first passageway.

5. An assembly as set forth in claim 4 wherein said hole (60) is substantially circular and said first notch (74) is substantially rectangular.

6. An assembly as set forth in claim 5 wherein said post (64) is substantially circular to fit snugly within said circular holes (60) and wherein said first passageway, defined by said first notches (74) of said second set of stacked lamina (52), is substantially rectangular.

7. An assembly as set forth in claim 4 wherein said second set of stacked lamina (52) includes a fixed number of lamina (46) while said first set of stacked lamina (50) can have a varied number of lamina (46) to vary an overall height of said stacked plurality of lamina (46).

8. An assembly as set forth in claim 1 wherein said plurality of lamina (46) further define a third set of stacked lamina (54) with each of said lamina (46) of said third set of stacked lamina (54) having said hole (60) and a second notch (78) disposed therein with said second notch (78) mating with said hole (60), said second notches (78) of said third set of stacked lamina (54) being aligned with each other to define a second passageway into said internal cavity.

9. An assembly as set forth in claim 8 wherein said post (64) includes a plurality of bores (68) disposed therein with one of said bores (68) aligned with said second passageway.

10. An assembly as set forth in claim 9 wherein said second passageway of said third set of stacked lamina (54) is larger than said bore (68) such that at least a portion of said outer surface (66) of said post (64) is exposed and is also aligned with said second passageway.

11. An assembly as set forth in claim 10 wherein said third set of stacked lamina (54) is identical to said second set of stacked lamina (52).

12. An assembly as set forth in claim 10 further including at least one lamina (46) of said third set of stacked lamina (54), having said second notch (78), being disposed above said bore (68) to further define said third set of stacked lamina (54) and said second passageway.

13. An assembly as set forth in claim 12 further including at least one lamina (46) of said third set of stacked lamina (54), having said second notch (78), being disposed below said bore (68) to further define said third set of stacked lamina (54) and said second passageway.

14. An assembly as set forth in claim 13 wherein said hole (60) is substantially circular and said second notch (78) is substantially rectangular.

15. An assembly as set forth in claim 14 wherein said post (64) is substantially circular to fit snugly within said circular holes (60) and wherein said second passageway, defined by said second notches (78) of said third set of stacked lamina (54), is substantially rectangular.

16. An assembly as set forth in claim 13 wherein said third set of stacked lamina (54) includes a fixed number of lamina (46) while said first set of stacked lamina (50) can have a varied number of lamina (46) to vary an overall height of said stacked plurality of lamina (46).

17. An assembly as set forth in claim 16 wherein said third set of stacked lamina (54) is identical to said second set of stacked lamina (52).

18. An assembly as set forth in claim 9 wherein said second (52) and third (54) sets of stacked lamina abut opposing ends of said first set of stacked lamina (50) to encompass said first set of stacked lamina (50).

19. An assembly as set forth in claim 18 wherein said plurality of lamina (46) further define a fourth set of stacked lamina (56) with each of said lamina (46) of said fourth set of stacked lamina (56) having said hole (60) disposed therein, said fourth set of stacked lamina (56) abutting said second set of stacked lamina (52) such that said second set of stacked lamina (52) is sandwiched between said fourth (56) and first (50) sets of stacked lamina and said first passageway is defined between said fourth (56) and first (50) sets of stacked lamina.

20. An assembly as set forth in claim 19 wherein said plurality of lamina (46) further define a fifth set of stacked lamina (58) with each of said lamina (46) of said fifth set of stacked lamina (58) having said hole (60) disposed therein, said fifth set of stacked lamina (58) abutting said third set of stacked lamina (54) such that said third set of stacked lamina (54) is sandwiched between said fifth (58) and first (50) sets of stacked lamina and said second passageway is defined between said fifth (58) and first (50) sets of stacked lamina.

21. An assembly as set forth in claim 1 wherein said post (64) includes a pair of distal ends with at least one of said ends being punched to form indentations (72) within said ends of said post (64) and to slightly deform said post (64) which securely interlocks said post (64) to said plurality of lamina (46).

22. An assembly as set forth in claim 1 wherein each lamina (46) of said plurality of lamina (46) include at least one interlocking tab (48) for interlocking said plurality of lamina (46) together.

23. An assembly as set forth in claim 1 wherein each lamina (46) of said plurality of lamina (46) include a pole portion (30) and an arcuate portion (32).

24. An assembly as set forth in claim 23 wherein each lamina (46) of said plurality of lamina (46) include a pair of interlocking tabs (48) disposed on said pole portion (30) for interlocking said plurality of lamina (46) together.

25. An electric motor (20) comprising:
   a stator (22) having a housing (26) and a plurality of pole piece assemblies (28) with said pole piece assemblies (28) each having a pole portion (30) and an arcuate portion (32);
   a plurality of coil windings (36) disposed about each pole portion (30) of said pole piece assemblies (28);
   a rotor (24) formed of a plurality of laminations (42) with each of said laminations (42) having an outer circumference and a plurality of equally spaced slots (44), said rotor (24) being disposed within said stator (22) with said outer circumference of said laminations (42) having a configuration complementary with said arcuate portion (32) of said pole piece assemblies (28);
   said pole piece assemblies (28) each including;
      a plurality of lamina (46) stacked onto each other defining a first set of stacked lamina (50) and a second set of stacked lamina (52), each of said lamina (46) of said first (50) and second (52) sets of stacked lamina including a hole (60) disposed therein with said holes (60) being aligned with each other to define an internal cavity; and
      a post (64) disposed within said cavity with said post (64) having an outer surface (66) and at least one bore (68) disposed therein; and
      a plurality of bolts (35) passing through said housing (26) and into said bore (68) of said pole piece assemblies (28) to mount said pole piece assemblies (28) to said housing (26);
   said electric motor (20) characterized by each of said lamina (46) of said second set of stacked lamina (52) further including a first notch (74) disposed therein with said first notch (74) mating with said hole (60) wherein said first notches (74) of said second set of stacked lamina (52) are aligned with each other to define a first passageway into said internal cavity with said bore (68) of said post (64) being aligned with said first passageway to expose said bore (68).

26. An electric motor (20) as set forth in claim 25 wherein said first passageway of said second set of stacked lamina (52) is larger than said bore (68) such that at least a portion of said outer surface (66) of said post (64) is exposed and is also aligned with said first passageway to create a counter bore configuration.

27. An electric motor (20) as set forth in claim 25 further including at least one lamina (46) of said second set of stacked lamina (52), having said first notch (74), being disposed above and below said bore (68) to further define said second set of stacked lamina (52) and said first passageway.

28. An electric motor (20) as set forth in claim 27 wherein said second set of stacked lamina (52) includes a fixed number of lamina (46) while said first set of stacked lamina (50) can have a varied number of lamina (46) to vary an overall height of said stacked plurality of lamina (46).

29. An electric motor (20) as set forth in claim 25 wherein said plurality of lamina (46) further define a third set of stacked lamina (54) with each of said lamina (46) of said third set of stacked lamina (54) having said hole (60) and a second notch (78) disposed therein with said second notch (78) mating with said hole (60), said second notches (78) of said third set of stacked lamina (54) being aligned with each other to define a second passageway into said internal cavity.

30. An electric motor (20) as set forth in claim 29 wherein said post (64) includes a plurality of bores (68) disposed therein with one of said bores (68) being aligned with said second passageway.

31. An electric motor (20) as set forth in claim 30 wherein said second passageway of said third set of stacked lamina (54) is larger than said bore (68) such that at least a portion of said outer surface (66) of said post (64) is exposed and is also aligned with said second passageway.

32. An electric motor (20) as set forth in claim 31 wherein said third set of stacked lamina (54) is identical to said second set of stacked lamina (52).

33. An electric motor (20) as set forth in claim 31 further including at least one lamina (46) of said third set of stacked lamina (54), having said second notch (78), being disposed above and below said bore (68) to further define said third set of stacked lamina (54) and said second passageway.

34. An electric motor (20) as set forth in claim 33 wherein said third set of stacked lamina (54) includes a fixed number of lamina (46) while said first set of stacked lamina (50) can have a varied number of lamina (46) to vary an overall height of said stacked plurality of lamina (46).

35. An electric motor (20) as set forth in claim 31 wherein said second (52) and third (54) sets of stacked lamina abut opposing ends of said first set of stacked lamina (50) to encompass said first set of stacked lamina (50).

36. An electric motor (20) as set forth in claim 35 wherein said plurality of lamina (46) further define a fourth set of stacked lamina (56) with each of said lamina (46) of said fourth set of stacked lamina (56) having said hole (60) disposed therein, said fourth set of stacked lamina (56) abutting said second set of stacked lamina (52) such that said second set of stacked lamina (52) is sandwiched between said fourth (56) and first (50) sets of stacked lamina and said first passageway is defined between said fourth (56) and first (50) sets of stacked lamina.

37. An electric motor (20) as set forth in claim 36 wherein said plurality of lamina (46) further define a fifth set of stacked lamina (58) with each of said lamina (46) of said fifth set of stacked lamina (58) having said hole (60) disposed therein, said fifth set of stacked lamina (58) abutting said third set of stacked lamina (54) such that said third set of stacked lamina (54) is sandwiched between said fifth (58) and first (50) sets of stacked lamina and said second passageway is defined between said fifth (58) and first (50) sets of stacked lamina.

38. An electric motor (20) as set forth in claim 25 wherein said post (64) includes a pair of distal ends with at least one of said ends being punched to form indentations (72) within said ends of said post (64) and to slightly deform said post (64) which securely interlocks said post (64) to said plurality of lamina (46).

39. An electric motor (20) as set forth in claim 25 wherein each lamina (46) of said plurality of lamina (46) include at least one interlocking tab (48) for interlocking said plurality of lamina (46) together.

40. An electric motor (20) as set forth in claim 25 wherein said bore (68) initially has a smooth inner surface and said bolt (35) has self tapping threads for forming interlocking grooves within said bore (68).

41. An electric motor (20) as set forth in claim 25 wherein each of said coil windings (36) disposed about said pole portions (30) of said pole piece assemblies (28) are interconnected together and said interconnected coil windings (36) include a pair of distal ends (38) that are connected to terminals (40) on said stator (22).

* * * * *